UNITED STATES PATENT OFFICE.

THEODOR RICHTERS, OF BRESLAU, PRUSSIA, GERMANY.

MANUFACTURE OF POTASSIUM FERROCYANIDE.

SPECIFICATION forming part of Letters Patent No. 245,661, dated August 16, 1881.

Application filed October 25, 1880. (No specimens.) Patented in France September 20, 1880, and in Belgium September 20, 1880.

*To all whom it may concern:*

Be it known that I, THEODOR RICHTERS, of Breslau, in the Kingdom of Prussia, Germany, have invented a new and useful Process for Obtaining Prussiate of Potash, Ammonia, Tar, and Gas from Nitrogenous Substances, of which the following is a specification.

The object of my invention is to obtain prussiate of potash, ammonia, tar, and gas from all kinds of nitrogenous substances; and for this purpose I mix the substances with carbonate of potassium, which will be always recovered again at the end of the operation.

The process is as follows: I moisten the azotized substances—such as old leather, fresh or dried blood, horn, hair, feathers, fur, felt, or cloth, &c.—with a solution of carbonate of potassium and then dry on a kiln below the temperature of combustion. The kiln must be constructed so that carbonic acid comes in contact with the substances to be dried, or the solution of carbonate of potassium can be made free of caustic potash before the moistening of the substances by introducing carbonic acid.
When the substances are very sandy it is necessary to get rid of the sand by washing with lye of potash before the drying. The well-dried substances are then transformed into gas in any convenient apparatus. Their fusion is not necessary. The escaping ammonia, gas, and tar are collected by any of the well-known means. The residuum in the retorts contains cyanide of potassium, hydrocyanate of potassium, sulpho-cyanide of potassium,
carbonate of potassium, sulphuret of potassium, caustic potash, and carbon. By lixiviating and boiling with metallic iron or peroxide of iron, the cyanide of potassium is changed into prussiate of potash and caustic potash. The solution is then evaporated and the prussiate of potash separated therefrom in any convenient manner. The remaining lye contains principally carbonate of potash and caustic potash, and is used again for moistening other nitrogenous substances.

The caustic potash is transformed into carbonate of potash during the drying manipulation.

Having now fully described my invention, what I claim as my invention, and desire to secure by Letters Patent, is—

The herein-described process of obtaining prussiate of potash, &c., consisting in moistening nitrogenous substances with carbonate of potash, or a mixture (substantially as described) containing the same; then drying them without combustion while in contact with carbonic acid; then heating them sufficiently in a retort or other suitable vessel to gasify and drive off all volatile ingredients, then washing or boiling the residuum with iron, and, finally, separating the prussiate of potash from said solution in any convenient manner.

THEODOR RICHTERS.

Witnesses:
   EMIL E. HAASE,
   FRANZ PORZAWKA.